United States Patent [19]

Geyer et al.

[11] Patent Number: 4,932,023
[45] Date of Patent: Jun. 5, 1990

[54] FRAME STRIPPING PROTOCOL FOR EARLY TOKEN RELEASE IN A RING COMMUNICATION NETWORK

[75] Inventors: Joel Erwin Geyer, Cary; Joseph K. Lee, Raleigh; Vernon R. Norman, Cary; Kenneth T. Wilson, Raleigh, all of N.C.

[73] Assignee: International Business Machines Corporation, Armonk, N.Y.

[21] Appl. No.: 368,739

[22] Filed: Jun. 20, 1989

[51] Int. Cl.$^5$ .............................................. H04J 3/16
[52] U.S. Cl. ................................. 370/85.4; 370/85.5; 370/85.15
[58] Field of Search ................. 370/86, 89, 94, 85, 370/95, 80; 340/825.05, 825.5, 825.51

[56] References Cited

U.S. PATENT DOCUMENTS

| | | | |
|---|---|---|---|
| 4,566,097 | 1/1986 | Bederman | 370/86 |
| 4,567,590 | 1/1986 | Bederman | 370/86 |
| 4,637,014 | 1/1987 | Bell et al. | 370/89 |
| 4,674,086 | 6/1987 | Szczepanek et al. | 370/86 |

Primary Examiner—Douglas W. Olms
Assistant Examiner—Alpus H. Hsu
Attorney, Agent, or Firm—John J. Timar

[57] ABSTRACT

A frame stripping algorithm for use in a ring communication network utilizing early token release wherein multiple frames can exist on the ring at one time. The algorithm introduces two new strip terminating conditions which supplement two of the three conditions applicable to a normal token release scheme. The first of these conditions occurs when the source address in a received message is not the same as the receiving station's address and no code violation errors have been detected. The second condition occurs when the receiving station detects an isolated ending delimiter without a preceding starting delimiter.

31 Claims, 12 Drawing Sheets

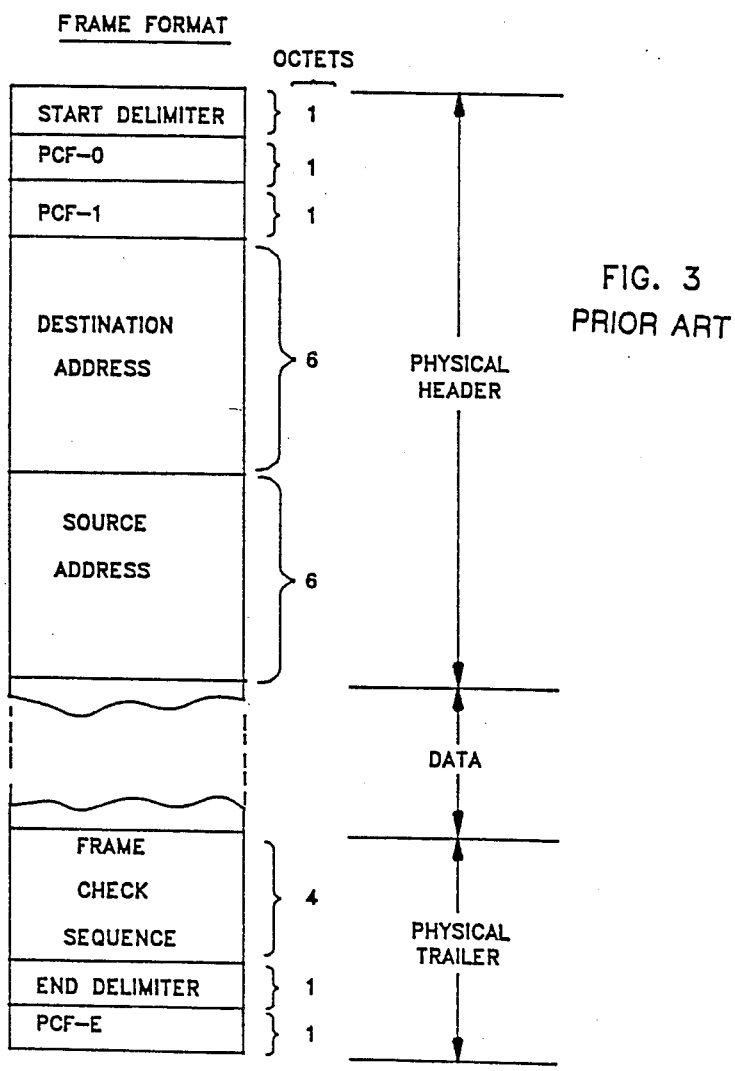

SDEL BAUD SEQUENCE

EDEL BAUD SEQUENCE

IDLE PATTERN

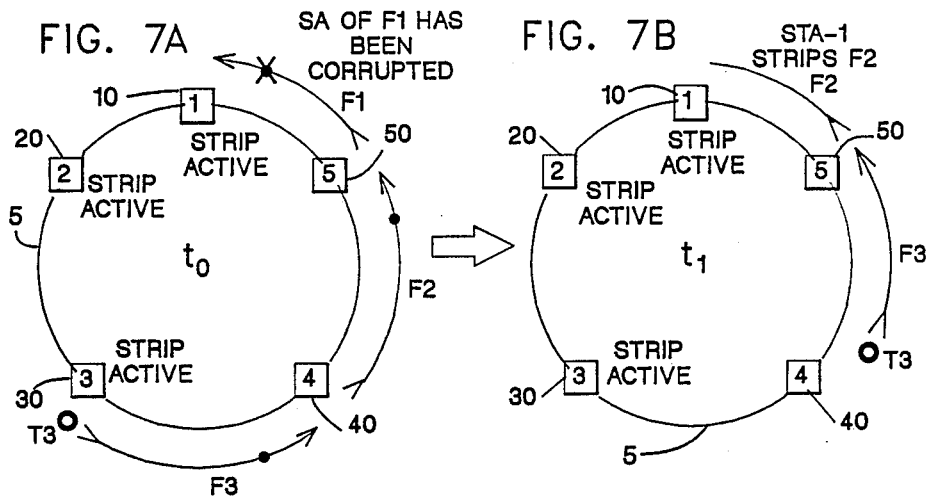
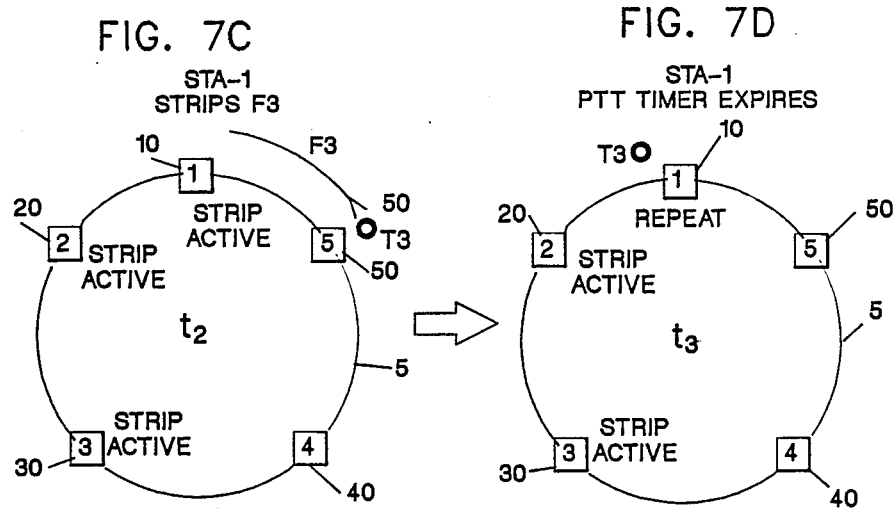
FIG. 7A, FIG. 7B, FIG. 7C, FIG. 7D
LEGEND:
→ — SDEL
>— — EDEL
• — SOURCE ADDRESS
○ — TOKEN

LEGEND:
⟶ – SDEL
⟩– – EDEL
• – SOURCE ADDRESS
○ – TOKEN

LEGEND:
⟶ — SDEL
⟩— — EDEL
• — SOURCE ADDRESS
○ — TOKEN

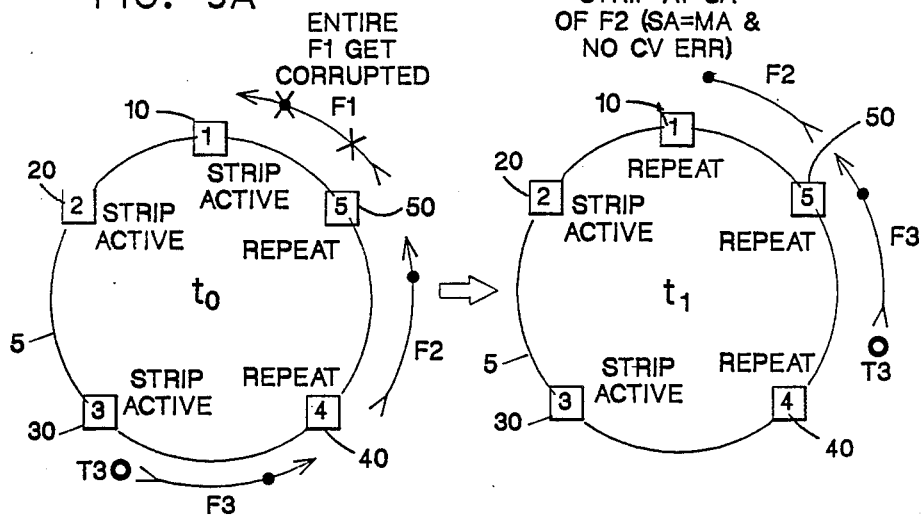

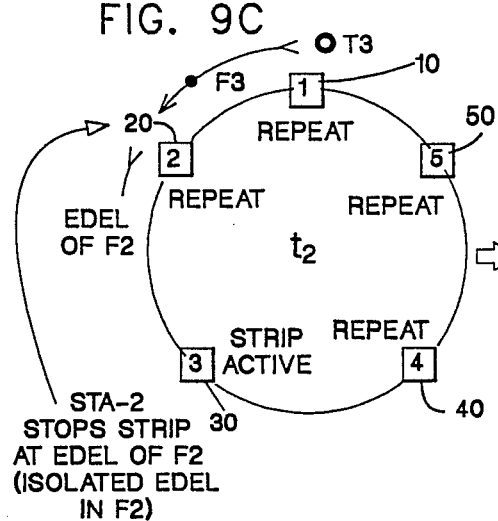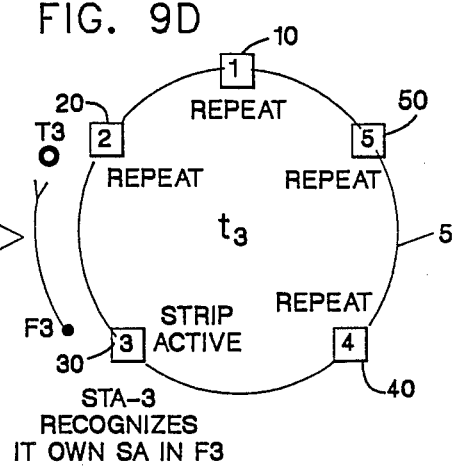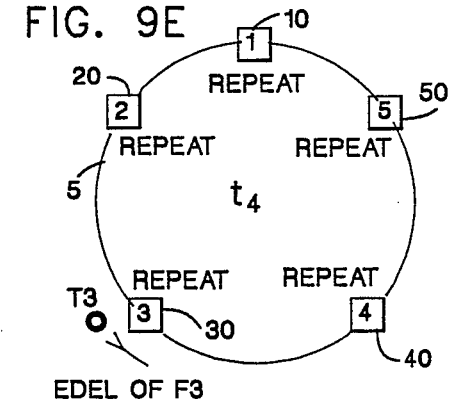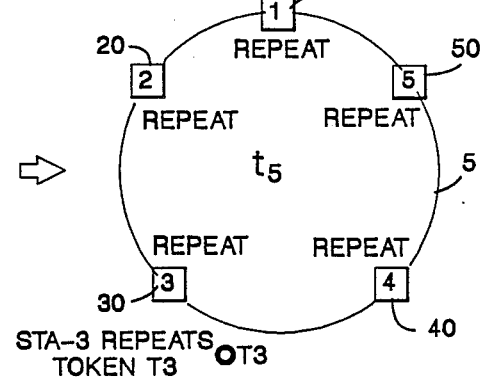

FRAME STRIPPING PROTOCOL FOR EARLY TOKEN RELEASE IN A RING COMMUNICATION NETWORK

BACKGROUND OF THE INVENTION

The invention relates to communication networks in general and more particularly to a protocol for stripping data from a network using early token release.

The use of ring communication networks for transferring data is well known in the prior art. These networks consist of a set of stations serially connected to a communication medium. Information is transferred sequentially, bit by bit, from one station to the next. The inactive stations are bypassed while the active stations regenerate and repeat each bit. Furthermore, stations are used as the means for attaching one or more devices (terminals, workstations, computers, displays, etc.) which communicate with other devices on the network.

An originating station transfers its information message onto the ring. The message circulates, passes one or more intermediate stations, until it arrives at the destination station where it is copied. In some implementations, the destination station strips the message from the ring. In other implementations, the message remains on the ring until it arrives at the originating station where it is stripped from the ring. Usually, the ring also includes a monitor station which is responsible for stripping messages that have not been stripped by the station normally responsible to perform the stripping. In addition, the monitor station may perform basic housekeeping functions for the ring.

An access method protocol is the mechanism which enables a station to transmit on the ring. One such access protocol is referred to as the token insert access protocol. This protocol provides a station with an opportunity to transmit whenever it receives a free token. The free token is usually generated by an upstream station. The token access protocol allows only one message to be on the ring at any particular instant of time. One characteristic of a token ring network is ring latency, which is the time, measured in bit times at the data transmission rate, that is required for a signal to propagate once around the ring. With a token access protocol, when the messages are relatively short, compared to the latency of the ring, only a fraction of the available bandwidth is used. Failure to use all of the available bandwidth reduces the efficiency of the ring because a series of idle patterns must be transmitted to fill up the vacancy on the ring.

In a ring which has a latency that greatly exceeds the duration of the shortest message and which employs an access protocol that allows multiple messages to co-exist on the ring, it is desirable for each station that has originated a message to strip this message, after the message has circulated once around the ring, such that the message will not be accepted a second time by a destination station.

A station must be able to distinguish between messages that require stripping actions by this station and those messages which require stripping actions by another station. In order to make this distinction, some serial buffering of a message may be required. It is desirable to keep such buffering to a minimum in order to reduce costs and to reduce added ring latency.

The prior art uses different types of stripping protocols to dispose of exhausted messages. One stripping protocol requires the target station to strip each message that it receives. This approach recovers bandwidth promptly, however, it is unsuitable for broadcast messages, destined for multiple target nodes. This approach also does not provide feedback to the original sending station.

Another stripping protocol requires that the sending station strip each message which it has sent, after this message comes back around the ring. This approach is suitable when the access protocol is such that no messages originated by another station can arrive at the sending station prior to the return of any messages which this sending station has originated.

U.S. Pat. No. 4,567,590 issued to Bederman discloses a message stripping protocol for a ring communication network in which a plurality of stations are used to strip expendable messages from a serial ring. One station uses either the destination field or the source address field as the basis for removing a portion of the message. Another station uses the status of a control indicia as the basis for removing the remaining portion of the message from the ring. By distributing the stripping between multiple stations on the ring, a significant reduction in ring latency is achieved.

Under normal token release a station holds the token until it has recognized the source address in the header of the returning frame. If the station completes frame transmission before receiving the header of the returning frame, the station must transmit idle characters until the header is received. If the transmitted frame is shorter than the bit capacity of the ring, bandwidth is wasted by transmitted idle characters. With the development of token rings that can handle data rates of 16 Mbps or greater, the number of bytes required to fill the ring increases and more idle characters are needed to fill the ring after frame transmission, adversely affecting efficiency. The concept of early token release allows a transmitting station to release the token as soon as it completes frame transmission, regardless of whether the frame header has returned to that station. With the early release of the token, the token is available to other stations sooner than in normal token release, and no idle characters fill the ring between the end of the transmitted message (consisting of the frame and an inter-frame gap) and the token. Thus, early token release allows multiple frames to be on the ring at the same time. A workstation on the ring now can transmit a token immediately after sending a frame of data, rather than waiting for its frame to return. Early token release improves the efficiency of the ring when the transmitted frames are shorter than the bit capacity of the ring.

In a token ring using the early token release scheme, the basic protocol has two problems. First, a transmit station will strip another station's frame if its own frame is corrupted. Second, a monitor station cannot detect an error condition in which all of the frames on the ring are being stripped by the wrong stations. This invention describes a scheme which will solve both of these problems.

SUMMARY OF THE INVENTION

It is an object of this invention to provide a novel stripping protocol which will enable a station to recognize an error condition at the earliest time.

It is a further object of this invention to provide a frame stripping algorithm that is simple to implement and that can be easily integrated into existing protocol handler hardware.

It is a still further object of this invention to provide a frame stripping algorithm that is applicable to both the normal token release and early token release schemes.

The frame stripping algorithm of the normal token release scheme was designed in such a way that it will only work on the ring with one frame at a time. If the source address field of the frame is corrupted, the only mechanism for the subject station to stop stripping is the expiration of the physical trailer timer (PTT) at the subject station, or the detection of a strip abort condition.

In a ring using early token release, the normal frame stripping algorithm is ineffective at handling corrupted frames. In the worst case scenario which will occur in a very busy ring in which all stations are waiting to transmit, a situation can occur in which all the frames on the ring are being stripped by the wrong station and the monitor station is unable to detect any protocol error condition because there are frames and tokens circulating around the ring. This situation can be sustained for a long time. As a result, no recovery action will be initiated and the throughput of the ring will degrade significantly. Briefly, the method of the present invention introduces two new strip terminating conditions to handle errors in a frame stripping process where multiple frames can exist on the ring simultaneously. In the first of these conditions, the originating station compares the source address in the header of the return frame with its own address. If they are not the same and if there are no code violation errors, the originating station will stop stripping. The occurrence of code violation errors is a manifestation of data corruption. The second condition for terminating stripping is if the originating station detects an isolated ending delimiter without a preceding starting delimiter.

The foregoing features and advantages of the invention will be more fully described in the accompanying drawings.

BRIEF DESCRIPTION OF THE DRAWINGS

FIG. 3 shows a schematic for the frame format.

FIGS. 7A-F illustrate an example of the early token release stripping problem.

FIGS. 9A-F illustrate an example of the use of the early token release stripping algorithm in a situation in which the entire return frame is corrupted.

DESCRIPTION OF THE PREFERRED EMBODIMENT

Figure 1:
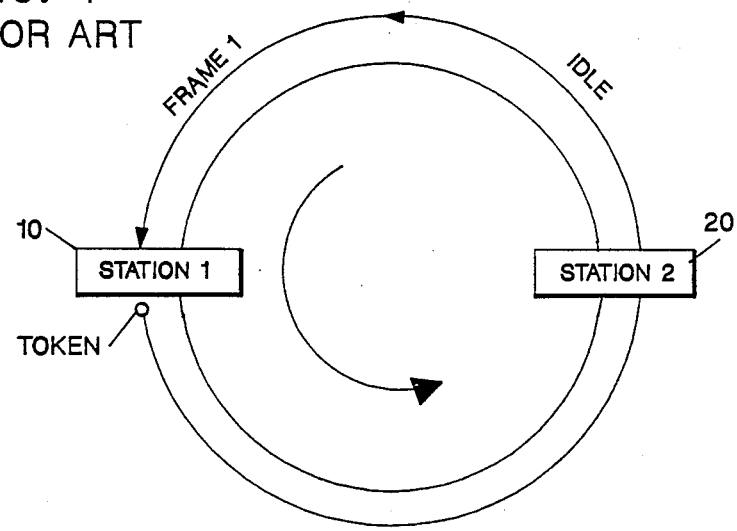
FIG. 1 illustrates the concept of normal token release.
Figure 2A:
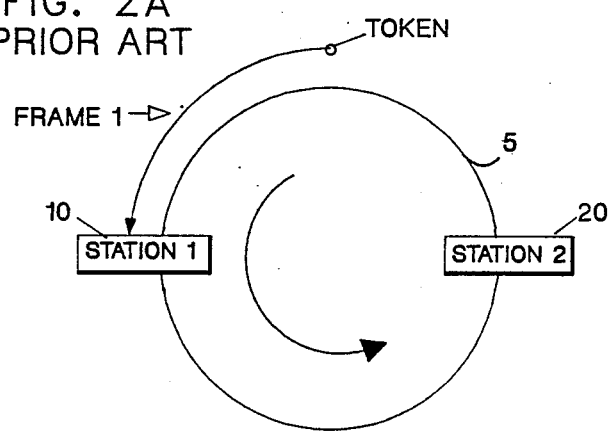
FIGS. 2A and 2B illustrate the concept of early token release.
Figure 2B:
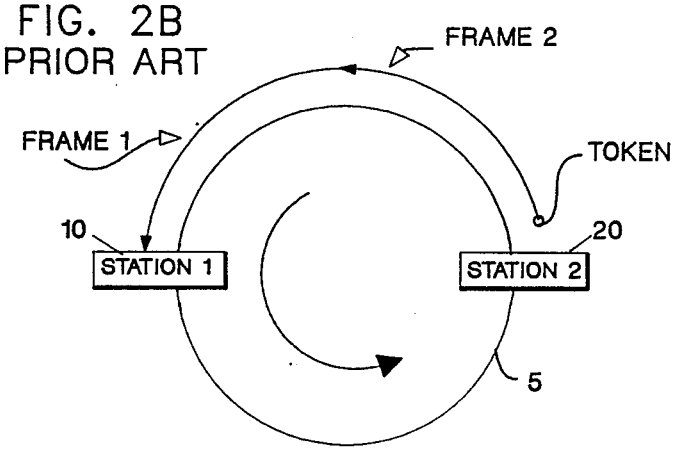

FIGS. 1 and 2 illustrate the conceptual differences between normal token release and early token release. In the normal token release illustrated in FIG. 1, station 1, indicated by reference numeral 10, transmits frame 1 and then transmits idle characters until receiving the header of frame 1, at which time it releases the token. FIG. 2 illustrates the concept of early token release in which station 1 transmits frame 1 and immediately transmits the token. Station 2, indicated by reference numeral 20, captures the token, transmits frame 2 and releases the token.

FIG. 3 shows the frame format for the messages which are generated and transmitted by a station onto the communication link. Each station includes a ring adapter and its connected data terminal equipment. This frame format is identical with that described in "IEEE Project 802 Local Network Standard," draft C, May 17, 1982 (Sec. V). The frame comprises the starting delimiter field, a physical control field (PCF-0 and PCF-1), a destination address field, a source address field, a data field, a frame check sequence field, an ending delimiter field, and a PCF-E field. The starting delimiter, PCF-0, PCF-1, destination address, and source address field are referred to as the physical header. The frame check sequence field, the ending delimiter field, and PCF-E field are referred to as the physical trailer. The number of bytes which are allotted to each field are also shown in FIG. 3. For example, the starting delimiter field has 1 byte.

Figure 4:
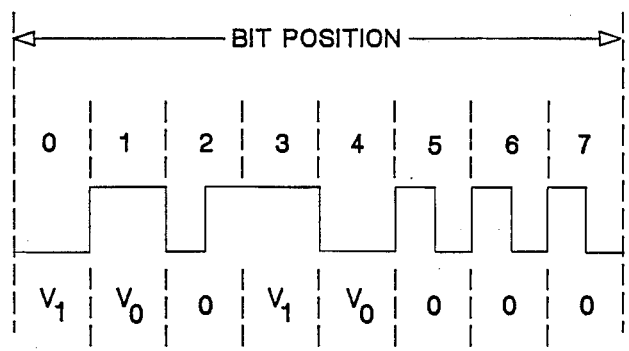
FIG. 4 shows a graphical representation of a starting delimiter (SDEL) baud sequence.
Figure 5:
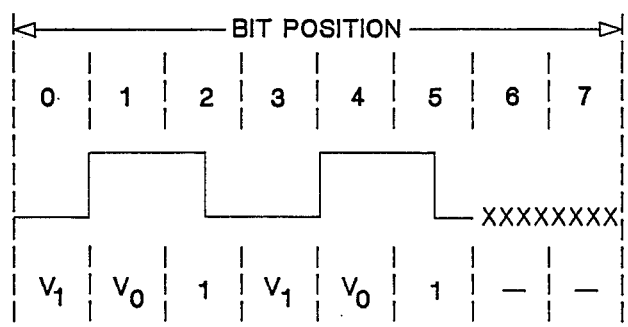
FIG. 5 shows a graphical representation of an ending delimiter (EDEL) baud sequence.
Figure 6:
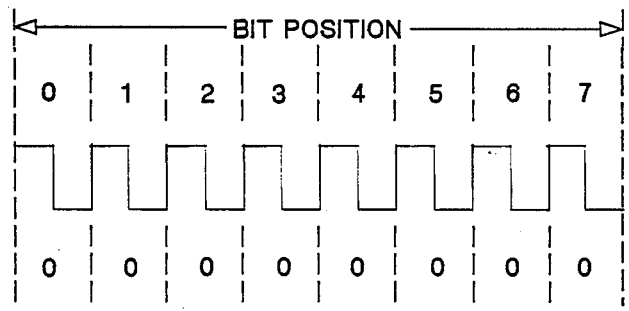
FIG. 6 shows a graphical representation of an idle pattern sequence. In this case, it is a "zero"-idle pattern. The idle pattern sequence can also be implemented as a "one"-idle pattern.

FIGS. 4, 5 and 6 show three 16-baud sequences that include code violations. These sequences are used to distinguish the starting delimiter, ending delimiter and idle patterns from the normal data words (since the normal data words do not include any code violations). It is assumed that differential Manchester coding is used for the signals that flow on the ring. Information is transmitted as 8-bit bytes where each bit is represented by a 2-baud signal pattern. Normally, the two bauds that correspond to a bit have opposite polarities, i.e., there is a transition between the two bauds. The pair of bauds that do not have any intervening transitions constitute a "code violation" pattern.

In a ring with early token release, a transmitting station will release the token as soon as it finishes sending its frame and the necessary inter-frame gap. In this condition, more than one frame may exist on the ring if its latency is long enough to hold them. The basic token ring protocol requires that each transmit station strip its own frame at the end of each transmit operation. The way that a transmit station can recognize its own frame is to check the source address (SA) field of the frame. This source address field contains the address of the frame's originating station. However, if the source address of any of the transmitted frames is corrupted, the originating station will not be able to recognize its own frame. Consequently, the originating station will strip other stations' frames. The process will continue until the PTT timer of the originating station expires. If this condition occurs, the token will eventually be destroyed. The monitor station will detect this error condition and recover the ring.

One situation that can occur in a very busy ring and sustain itself for a long period of time is one in which all the stations in the ring are waiting to transmit, and the strip timing of each transmitting station is set up in such a way that a token manages to stay alive in the ring despite the continuous stripping activities of all stations. As a result, the unstripped token is continuously used by the waiting stations, but all the transmitted frames are being stripped continuously by the other stripping stations. Since there are frames and tokens flowing around the ring, the monitor station will not be able to detect any protocol errors. Consequently, no recovery action will be initiated and the throughput of the ring will degrade significantly. The early token release stripping protocol enables the originating station to detect the error condition at the earliest possible time and stop stripping to preserve the follow-on frames and token.

In the IEEE 802.5 Token Ring Protocol, the algorithm for a transmitting station to terminate its strip operation is that one of the following conditions have occurred: (1) the station sees its own frame return and an end of frame delimiter is seen; (2) the physical trailer timer (PTT) of the station has expired; (3) a strip abort condition is detected by the station. This algorithm works fine in a normal token release ring where one frame exists on the ring at a time. However, once early token release is implemented, the normal token release stripping algorithm will not function correctly and will result in degrading the throughput of the ring.

The strip abort conditions can be either explicit or implicit. In an explicit abort situation which can result from hardware errors like data parity errors or data underrun during transmission, the transmitting station will initiate the abort by transmitting a starting delimiter followed immediately by an ending delimiter. There are several different implicit abort conditions. In one, while it is stripping, a station receives a starting delimiter that is not followed immediately by an ending delimiter (to differentiate from an explicit abort) within a frame. This could occur in transmit immediate mode, for example, when one station starts transmitting in the middle of a frame transmitted by another station. In transmit immediate mode, a station does not need a token to initiate a frame transmission. Other implicit aborts include detecting an ending delimiter that is not byte-aligned with respect to the last starting delimiter received, detecting a starting delimiter where the physical control frame ending field (PCF-E) was expected, or the ring front-end-ready (FEREDY) signal deactivating while a frame is being stripped due to an off-frequency or lost energy condition. A final implicit abort is referred to as a "burst-4" error and is defined as four bauds of Manchester encoded data without transitions.

Figure 7E:
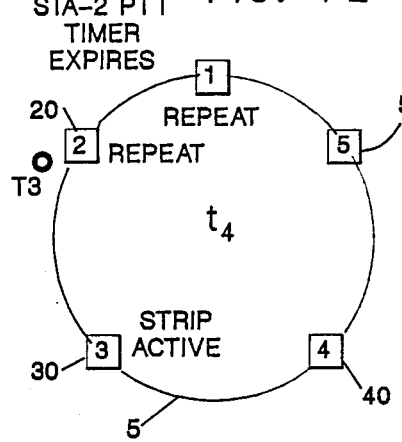
Figure 7F:
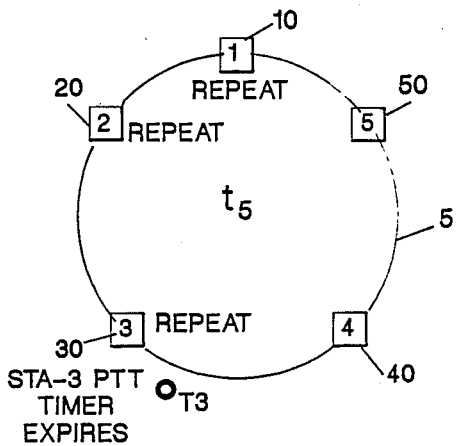
Figure 8A:
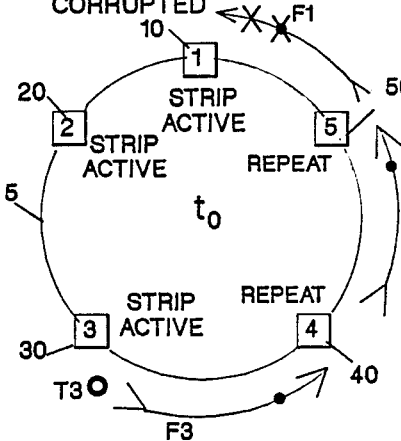
FIGS. 8A-F illustrate an example of the use of the early token release stripping algorithm with a corrupted frame header.
Figure 8B:
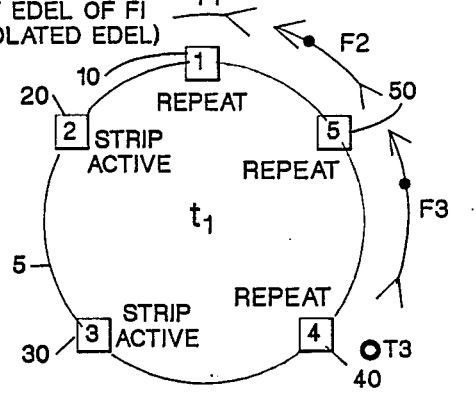
Figure 8C:
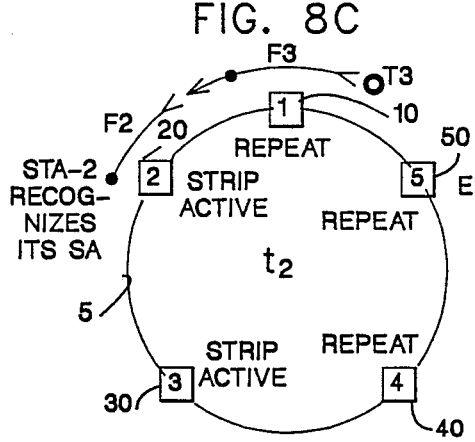
Figure 8D:
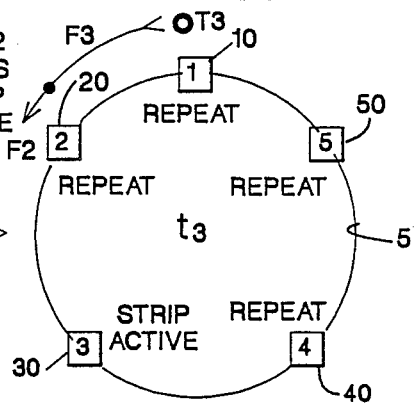
Figure 8E:
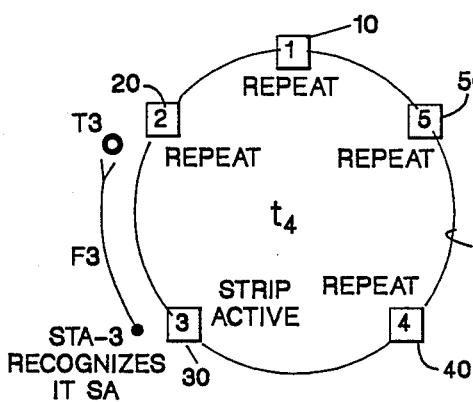
Figure 8F:
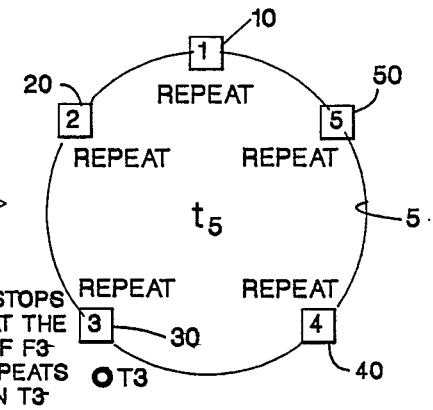

FIG. 7 illustrates an example of one early token release stripping problem. Included is a closed loop unidirectional transmission medium identified by numeral 5. To simplify the description, there are only five stations depicted on the ring indicated by reference numerals 10, 20, 30, 40 and 50. Also illustrated are three frames labeled F1, F2, and F3 released respectively by stations 1, 2, and 3. Following the transmission of frame 3 by station 3 is the token labeled T3. Stations 1, 2 and are in an active stripping mode. At time $T_0$ (FIG. 7A), the source address of frame 1 is being corrupted. At time $T_1$ illustrated in FIG. 7B, since station 1 cannot recognize its own corrupted frame 1, it will continue to strip frame 2. Stations 2 and 3 are also in a strip mode waiting for their transmitted frames to return. At time $T_2$ illustrated in FIG. 7C, since the PTT timer of station 1 has not yet expired, station 1 continues to strip frame 3. Stations 2 and 3 continue in a strip mode. At time $T_3$ illustrated in FIG. 7D, the PTT timer of station 1 has expired just before the token (T3) is stripped. Therefore, station 1 stops stripping and repeats T3. Stations 2 and 3 continue in the strip mode. At time $T_4$ (FIG. 7E), the PTT timer of station 2 has expired just before the token (T3) is stripped. Therefore, station 2 stops stripping and repeats T3. Station 3 is now the only station in a strip mode. At time $T_5$ (FIG. 7F) the PTT timer of station 3 expires just before the token (T3) is stripped. Thus, station 3 stops stripping and repeats T3. Now all the stations in the ring are in a repeat mode with a circulating token. There is no error indication that the monitor station will recognize in spite of the fact that all three transmitted frames have been destroyed by the transmitting stations themselves.

To illustrate the worst case condition consider a token ring containing hundreds of stations all of which are continuously busy, i.e., waiting for tokens in order to transmit. At some point in time during the operation of the ring, the source address of one transmitted frame becomes corrupted as described with reference to FIG. 7A and a token remains unstripped and circulating around the ring as illustrated in FIG. 7F. The unstripped token will be used by the next waiting station to transmit another frame followed with another token. Consequently, all the transmitted frames will never be able to return to their source stations because they will be stripped by some other stations on the ring. If the token continues to survive, this condition will sustain for a long period of time. Since there are frames and tokens flowing continuously around the ring, the monitor station will not detect any protocol error and will not initiate ring recovery.

If, in FIG. 7A, the frame transmitted by station 3 (F3) is intended for station 2, it will be lost since station 1 has stripped it off the ring. This lost frame will be detected by higher layer protocols and then re-transmitted. This chain reaction effectively reduces the ring overall throughput.

This invention provides a new frame stripping algorithm that supplements two of the three three conditions that apply to normal token release with two additional conditions that solve the early token release frame stripping problem. The detection of an explicit or implicit abort condition as explained above is not used in the method described herein. The additional conditions to terminate stripping are as follows: (1) the source address of a received frame is not equal to the originating station's address and no code violation errors have occurred in the header of the return frame; (2) an isolated ending delimiter (IED) has been received without receiving a preceding starting delimiter (SDEL). Examples of the operation of the augmented early token release stripping algorithm are illustrated with the sequences shown in FIGS. 8 and 9.

In FIG. 8 three stations, stations 1, 2 and 3 are in strip mode following their transmit operations. Three frames, denoted F1, F2 and F3, exist on the ring along with a token T3 which was released by station 3 using the early token release scheme. At time $T_0$ as indicated in FIG. 8A, the frame header of frame 1 containing the starting delimiter and source address is being corrupted. At time $T_1$ as indicated in FIG. 8B, since station 1 cannot recognize its own starting delimiter and source address in frame 1, it will continue to strip until is sees the ending delimiter of frame 1 as an isolated ending delimiter (IED). At this time station 1 stops stripping and repeats frame 2, frame 3 and the token (T3). At time $T_2$ station 2 sees its own source address in frame 2, thus recognizing that this is its own frame. Station 2 will continue to strip until the end of frame 2. At time $T_3$ shown in FIG. 8D, station 2 stops the strip at the end of frame 2 and then repeats frame 3 and the token (T3). At time $T_4$ as shown in FIG. 8E, station 3 sees its own source address in frame 3, so it recognizes that this is its own frame. Station 3 continues to strip until the end of frame 3. At time $T_5$, shown in FIG. 8F, station 3 stops stripping at the end of frame 3 and repeats the token (T3). From this example, it can be seen that the new frame stripping algorithm enables station 1 to stop stripping the frames at the end of its own corrupted frame. This is the earliest time that it can stop stripping before damaging the following frames.

The sequence in FIG. 9 is another example illustrating how the early token release stripping algorithm works in a scenario where the entire frame (F1) originated by station 1 is being corrupted, i.e., the starting delimiter, source address, and ending delimiter are not recognizable. At time $T_0$ as shown in FIG. 9A, the entire frame from station 1 is being corrupted. At time $T_1$ as shown in FIG. 9B, since station 1 cannot recognize its own frame, it will continue to strip until it sees the source address of frame 2. At this time, since there are no code violation errors detected, station 1 stops stripping based on the first new stripping termination condition, and repeats the rest of frame 2, frame 3 and the token (T3). At time $T_2$ as shown in FIG. 9C, station 2 sees its own ending delimiter as an isolated ending delimiter (IED) and stops stripping. It then repeats frame 3 and the token (T3). At time $T_3$ as shown in FIG. 9D, station 3 recognizes its own source address in frame 3. It will continue to strip until the end of frame 3. At time $T_4$ as shown in FIG. 9E, station 3 stops stripping at the end of frame 3. Finally, at time $T_5$ as shown in FIG. 9F, station 3 repeats the token (T3). All the stations in the ring are now back to a repeat mode. This second example illustrates how in a worst case situation station 1 will stop stripping at the next frame header after its own corrupted frame. Station 2 is able to stop its stripping at the end of its own frame (F2) due to an isolated ending delimiter (IED). Thus, as a result of the new algorithm, the ring is able to recover as early as possible after a strip error condition occurs. This inhibits the formation of the problem described in conjunction with FIG. 7.

Figure 10:
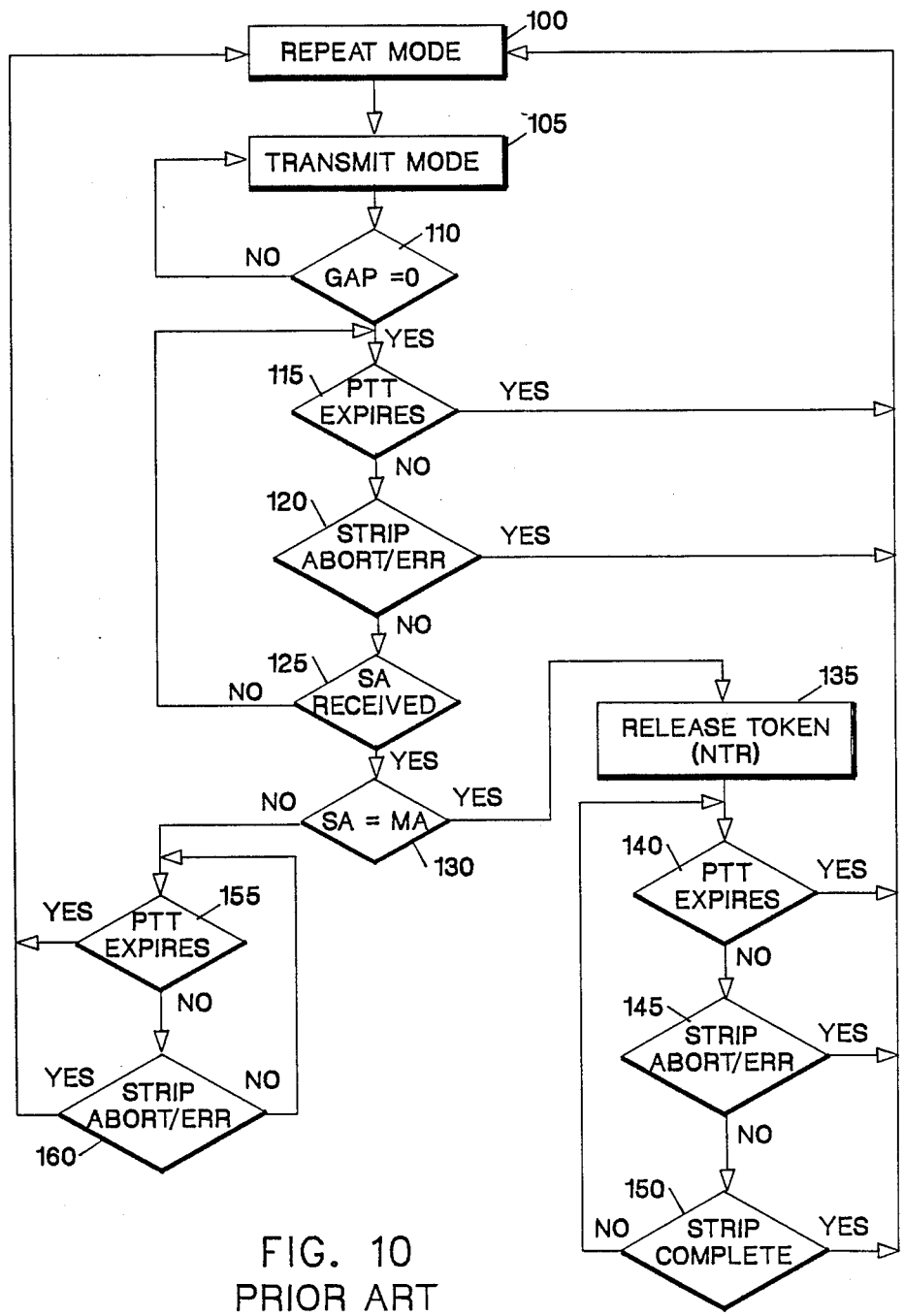
FIG. 10 is a flow diagram illustrating the normal token release stripping algorithm.
Figure 11:
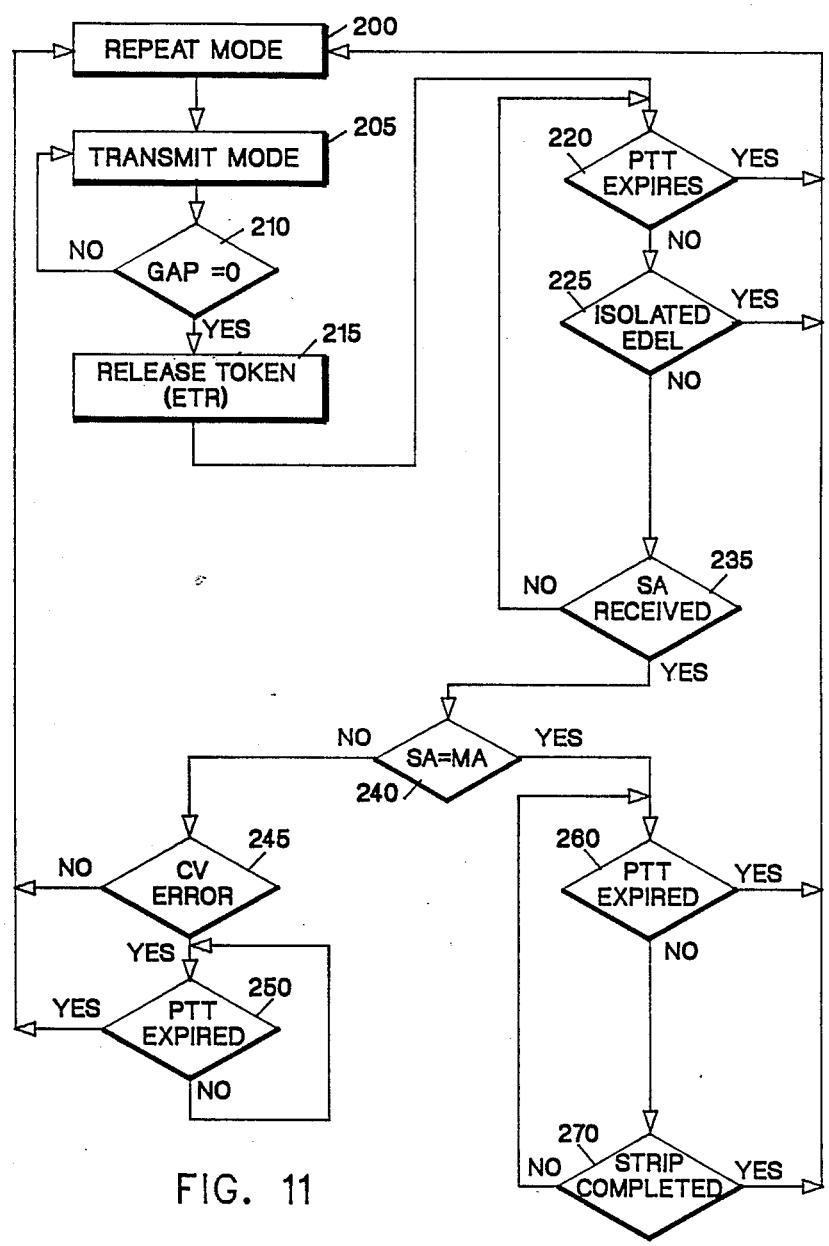
FIG. 11 is a flow diagram illustrating the early token release stripping algorithm of this invention.

FIGS. 10 and 11 illustrate respectively the old frame stripping algorithm used in normal token release and the early token release frame stripping algorithm of this invention. Referring now to FIG. 10, a station is originally in repeat mode indicated by logic block 100 until it acquires the free token. Once it acquires the token, it goes into transmit mode indicated by logic block 105. Transmit mode enables the strip function. Once a station completes its transmission of a message frame, it will transmit an idle pattern of one or more bytes. This is indicated in FIG. 10 by logic block 110. An affirmative response to the "GAP=0" condition means that the last idle pattern byte has been transmitted. The station will remain in transmit mode and continue to transmit idle patterns after its frame until it receives its own source address (SA) in the header of the return message frame (logic block 125), unless the PTT timer has expired (logic block 115) or a strip abort condition has occurred (logic block 120) previously. In logic block 130 a test is made for whether the source address is equal to the originating station's address. If the response is positive, the token is released (normal token release), and then a test is then made in logic block 150 to determine if the strip is complete which is indicated by the receipt of the ending delimiter and the PCF-E byte of the station's own return frame. Only the expiration of the PTT timer (logic block 140) or the detection of a strip abort condition (logic block 145) will cause stripping to terminate sooner. If, in logic block 130, the source address is not equal to the originating station's address, then either of the conditions indicated in logic blocks 155 and 160 will cause the stripping of messages to terminate. The first of these conditions is the time-out condition of logic block 155 in which the PTT timer that had been activated after the transmission of the frame at the originating station has expired. Expiration of the timer will cause the termination of transmit mode and return the originating station to a repeat mode. Otherwise, only the detection of a strip abort condition in logic block 160 will cause termination of transmit mode. All of the logic blocks in FIG. 10 that result in the transition of the station back to the repeat mode serve to terminate the strip function.

The frame stripping algorithm of this invention is illustrated in the logic flow chart of FIG. 11. The originating station is initially in repeat mode indicated by logic block 200. Upon acquiring the token, the station enters into a transmit mode shown in logic block 205. It remains in transmit mode until it transmits an idle pattern of one or more bytes (gap) at the end of its frame as indicated in logic block 210. Next, the station releases a token (early token release) as shown in block 215. The originating station goes into a strip mode and then waits for the source address (SA) of the return message frame (logic block 235). Prior to receiving a good frame, however, the expiration of the PTT timer (logic block 220) or the detection of an isolated ending delimiter (logic block 225) will result in the termination of the strip function and a return to repeat mode (logic block 200). An isolated ending delimiter means that the originating station has detected an ending delimiter in the return frame without the receipt of a preceding starting delimiter.

The source address of the return message frame is examined in logic block 240 and compared to the address of the originating station. If they are the same, then the originating station continues to strip the message frame off the ring until it detects a end-of-frame delimiter and PCF-E in logic block 270 unless the PTT timer expires (logic block 260) sooner.

If the source address is not the same as the originating station's address in logic block 240, then either of the conditions indicated by logic blocks 245, or 250 will cause the station to terminate strip operations. In logic block 245, a test is made for code violation errors in the header of the return frame. This is followed in logic block 250 with a test for a hardware generated time-out. All of the logic blocks that result in the termination of the strip function return the station to the repeat mode indicated by logic block 200.

Figure 12:
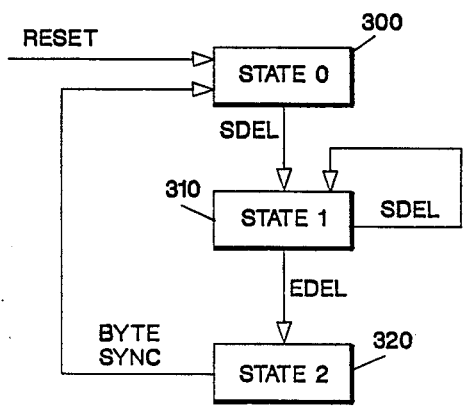
FIG. 12 illustrates an algorithm for the detection of an isolated ending delimiter.

FIG. 12 depicts a finite state machine representation of the algorithm for detection of an isolated ending delimiter. State 0, indicated by block 300, represents a quiescent or reset state. A station remains in this state until a starting delimiter is detected at which time it transitions to state 1 represented by block 310. Receipt of a starting delimiter while in state 1 results in the station remaining in state 1. Detecting an ending delimiter while in state 1 causes a transition to state 2, indicated by block 320. State 2 is a temporary state and the station will remain there for two bit times corresponding to the last two bits of the ending delimiter which are ignored during the ending delimiter decoding. There is then an immediate transition back to state 0 at the end of the EDEL byte (BYTE SYNC). An isolated ending delimiter (IED) is defined as an ending delimiter detected while in state 0 of this state machine. This detection of an isolated ending delimiter results in the termination of strip operations.

Figure 13:
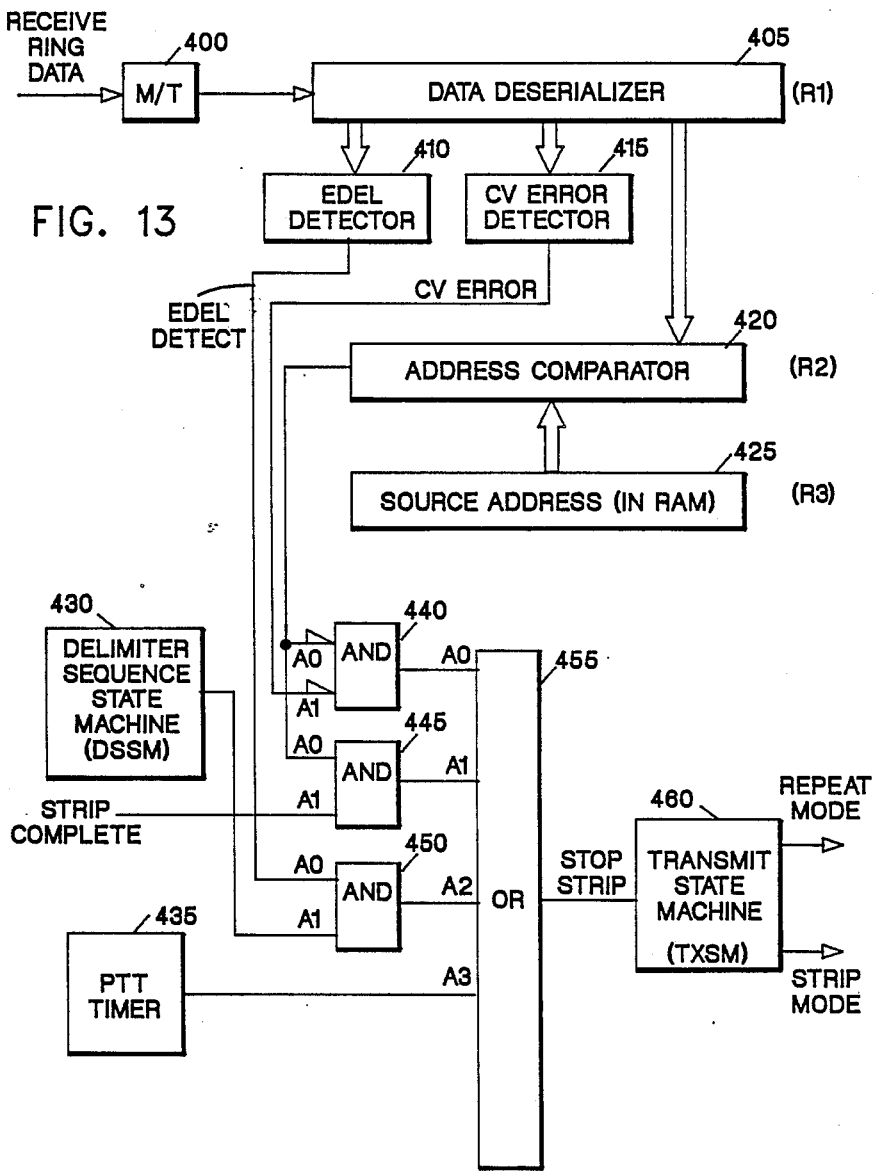
FIG. 13 illustrates a block diagram implementation of the early token release stripping algorithm of the invention.

FIG. 13 represents a block diagram hardware implementation of the early token release stripping algorithm of this invention. Manchester-encoded data messages are received from the ring and converted to transitional code in Manchester-to-transitional decoder (M/T) 400. The decoded serial ring data is shifted into a 16 baud data deserializer register (R1) 405 which deserializes the serial data stream into a parallel data stream. The parallel data of the data deserializer 405 is loaded into the source address comparator register (R2) 420 at the necessary time to do the source address comparison. The station's own source address is stored in RAM (R3) and fetched into R2 during address comparison. Also tapping at the parallel output of the data deserializer are an ending delimiter detector 410 and a code violation error detector 415. Other major components of the implementation are a PTT timer 435, a delimiter sequence state machine (DSSM) 430, and a transmit state machine (TXSM) 460.

The PTT timer 435 serves as a maximum time limiter for the stripping process. It is started by the transmit state machine 460 at the beginning of the strip process. If, after a predetermined period of time, a station is still in strip mode, the PTT timer 435 will signal the transmit state machine 460 to terminate the strip process. The delimiter sequence state machine 430 is used to detect an isolated ending delimiter. It operates in association with the finite state machine representation of the ending delimiter detection algorithm contained in FIG. 12. The transmit state machine 460 is the main control state machine for the transmit and strip sequence in a station. It coordinates the operation sequence during a transmit and strip process.

The conditions that will terminate message frame stripping are connected to the inputs of OR gate 455 which, in turn, send a signal to the transmit state machine 460 to stop stripping and enter a repeat mode. The PTT timer 435 causes input A3 on OR gate 455 to go high at the expiration of the time that had been set. The other termination conditions are handled by the inverted AND gate 440 and the normal AND gates 445 and 450, the outputs of which are connected to inputs A0, A1 and A2 respectively on OR gate 455. The normal strip termination condition is represented by AND gate 445. If in address comparator 420, the source address in the received message is found to be the same as the station's address and if an ending delimiter and PCF-E is received (strip complete), then the input A1 on OR gate 455 goes high and sends a stop strip signal to transmit state machine 460. If an ending delimiter is detected by ending delimiter detector 410 and if the delimiter sequence state machine 430 determines that it is an isolated ending delimiter, then the output from AND gate 450 causes the A2 input on OR gate 455 to go high, thus causing abnormal strip termination. Finally, if in address comparator 420 the source address of the received frame differs from the station's address and if code violation errors are not detected in CV error detector 415, then the output from inverted AND gate 440 causes the A0 input on OR gate 455 to go high, thus abnormally terminating strip operations.

While the invention has been particularly shown and described with reference to the preferred embodiment thereof, it will be understood by those skilled in the art that various changes in form and details may be made therein without departing from the spirit and scope of the invention. It should be noted in particular that the invention described herein is applicable to any token ring network regardless of the data or delimiter encoding format, including the bridged frame stripping scheme for the 100 Mbps Fiber Distributed Data Interface (FDDI) protocol which is the subject of proposed American National Standards Institute (ANSI) standard X3T9.5. The FDDI protocol uses encoding schemes other than differential Manchester encoding so that the detection of no code violation errors as an indication of data integrity in the first condition for terminating frame stripping is not directly applicable. However, the scope of this invention is intended to cover alternative methods for detecting the presence or absence of data corruption in the header of a message intended for another station downstream from the one that is trying to determine whether or not to terminate stripping.

Having thus described our invention, what we claim as new and desire to secure by Letters Patent is:

1. A method for removing corrupted messages from a communication network wherein each corrupted message is characterized in that at least a part of the message has been damaged before being removed from the network comprising the steps of:
generating a formatted message having a header with a starting delimiter field and a source address field, and a trailer with an ending delimiter field, at an originating station;
transmitting the formatted message onto the network;
releasing a token onto the network at the originating station;
activating a message stripping mode at the originating station; and
receiving and removing messages from the network until a strip termination condition for corrupted messages is detected.

2. The method of claim 1 wherein the step of receiving and removing messages includes the additional steps of:
comparing the source address of the received message with the address of the originating station; and
determining if any code violation errors have occurred in the header of the received message.

3. The method of claim 1 wherein the step of receiving and removing messages includes determining if an ending delimiter field has been received without a corresponding preceding starting delimiter field.

4. The method of claim 2 wherein the first strip termination condition for corrupted messages is the receipt of a message in which the source address of the message is unequal to the originating station's address and no code violation errors have been detected in the header of the message.

5. The method of claim 3 wherein the second strip termination condition for corrupted messages is the receipt of a message having an ending delimiter field without a corresponding preceding starting delimiter field.

6. The method of claim 1 including the steps of starting a physical trailer timer at the originating station and terminating the removing of messages when said physical trailer timer expires.

7. An apparatus for removing corrupted messages from a ring in a communication network system wherein each of a plurality of stations is operable to place formatted messages on the ring or remove formatted messages from the ring and wherein each message contains a header, a data field, and a trailer, with each corrupted message characterized in that at least a part of the message has been damaged before being removed from the network said apparatus comprising:

means for transmitting onto the ring from an originating station a formatted message including a starting delimiter, the identity of the source of the message, and an ending delimiter;

means for activating a message stripping mode at the originating station;

means for receiving and removing messages from the ring;

means for detecting an strip termination condition for corrupted messages received at the originating station; and means for terminating the removing of messages that is responsive to the detecting of an strip termination condition.

8. The apparatus of claim 7 including means for comparing the source address of the received message with the address of the originating station.

9. The apparatus of claim 7 including means for detecting code violation errors in the header of the received message.

10. The apparatus of claim 7 including means for determining if an ending delimiter has been received without receiving a corresponding starting delimiter.

11. The apparatus of claim 7 including a physical trailer timer means at the originating station which is activated upon completion of transmission of the message and is then decremented for limiting the maximum amount of time that the originating station will strip messages off the ring.

12. A method for removing corrupted messages from a communication network wherein each corrupted message is characterized in that at least a part of the message has been damaged before being removed from the network comprising the steps of:

generating a formatted message having a phYsical header, a data field, and a physical trailer at an originating station;

transmitting the formatted message onto the network;

transmitting a first predetermined bit pattern followed by the release of the token onto the network at the originating station;

activating a message stripping mode at the originating station; and receiving, examining and removing received messages from the network until a strip termination condition for corrupted messages is detected.

13. The method of claim 12 wherein the physical header includes a second predetermined bit pattern and a source address, and the physical trailer includes a third predetermined bit pattern.

14. The method of claim 13 wherein the step of examining the received message includes comparing the source address with the address of the originating station and determining if any code violation errors have occurred in the header.

15. The method of claim 13 wherein the step of examining the received message includes determining if the third predetermined bit pattern has been detected before the detection of the corresponding second predetermined bit pattern.

16. The method of claim 13 wherein the first strip termination condition for corrupted messages is the receipt of a message in which the source address is not the originating station's address and no code violation errors are detected in the message header.

17. The method of claim 13 wherein the second strip termination condition for corrupted messages is detecting the third predetermined bit pattern in a received message without detecting the corresponding second predetermined bit pattern.

18. The method of claim 12 including the steps of starting a physical trailer timer at the originating station when it completes message transmission and terminating the removal of messages when the timer decrements to zero.

19. An apparatus for removing corrupted messages from a ring in a communication network system wherein each of a plurality of stations is operable to place formatted messages on the ring or remove formatted messages from the ring and wherein each message contains a header, a data field, and a trailer, with each corrugated message characterized in that at least a part of the message has been damaged before being removed from the network said apparatus comprising:

means for transmitting formatted message onto the ring at an originating station;

means for activating a message stripping mode at the originating station;

means for receiving and removing messages from the ring at the originating station;

means at the originating station for examining the received messages and detecting an strip termination condition; and means for terminating the removing of messages that is responsive to the detecting of an strip termination condition.

20. The apparatus of claim 19 wherein said transmitted idle pattern is a first predetermined bit pattern having eight bits.

21. The apparatus of claim 19 including means for comparing the source address in the message header with the address of the originating station.

22. The apparatus of claim 19 including means for detecting code violation errors in the header of the received message.

23. The apparatus of claim 19 including means for determining if a third predetermined bit pattern has been detected at the originating station before a corresponding second predetermined bit pattern has been detected.

24. The apparatus of claim 23 wherein the second predetermined bit pattern an light eight starting delimiter located in the header of the received message.

25. The apparatus of claim 23 wherein the third predetermined bit pattern is an eight bit ending delimiter located in the trailer of the message.

26. The apparatus of claim 19 including a physical trailer timer means at each station which is activated at an originating station upon completion of message transmission and is then decremented for limiting the maximum amount of time that the originating station will strip messages off the ring.

27. An apparatus for removing corrupted messages from a token ring in a local area network wherein each of a plurality of stations is operable to transmit messages onto the ring or remove messages from the ring, said apparatus comprising:

Manchester-to-transitional decoder means for converting the differential Manchester encoded messages received at a station into a transitional encoded serial data stream;

data deserializer means for receiving the transitional encoded serial data stream and outputting a parallel data stream;

memory means for storing the address of the station;

comparator means for loading and comparing the contents of the memory means and the contents of the data deserializer means;

code violation error detector means for detecting code violation errors in the header of the received message;

ending delimiter detector means for detecting an ending delimiter bit sequence;

delimiter sequence state machine means for determining if an ending delimiter bit sequence has been received without a preceding starting delimiter bit sequence;

logic circuitry means for determining when to stop the removing of messages from the ring and, responsive to said determination, generating a signal to stop removing messages; and transmit state machine means for accepting the signal to stop removing messages and placing the station in a repeat message mode.

28. The apparatus of claim 27 including physical trailer timer means cooperative with said logic circuitry means for activating a timeout mechanism which after a predetermined time interval causes said logic circuitry means to generate a signal to stop removing messages from the ring.

29. The apparatus of claim 27 including strip abort means cooperative with said logic circuitry means for detecting at least one of a plurality of strip abort conditions and, upon detecting said condition causing said logic circuitry means to generate a signal to stop removing messages from the ring.

30. A method for removing corrupted messages from a communication network containing a plurality of stations, each station having the capability of sending and receiving messages over the network, wherein a station that has completed its message transmission releases a token and goes into a frame stripping mode, said method comprising:

comparing the source address of each received message with the address of the frame stripping station;

detecting if any code violation errors have occurred in the header of said received message; and removing messages from the network until a message is received in which the source address is not the same as the address of the frame stripping station and no data corruption has been detected in the header of said received message.

31. An apparatus for removing corrupted messages from a communication network system containing a plurality of stations wherein each station is operable to send and receive formatted messages over the network, and at least one station is in frame stripping mode, said apparatus comprising:

means for comparing the source address of each received message with the address of the stripping station;

means for detecting code violation errors in the header of each received message;

means for removing messages from the network at said stripping station; and means for terminating the removing of messages at said stripping station that is cooperative with said means for comparing and said means for detecting.

* * * * *